United States Patent Office 2,806,552
Patented Sept. 17, 1957

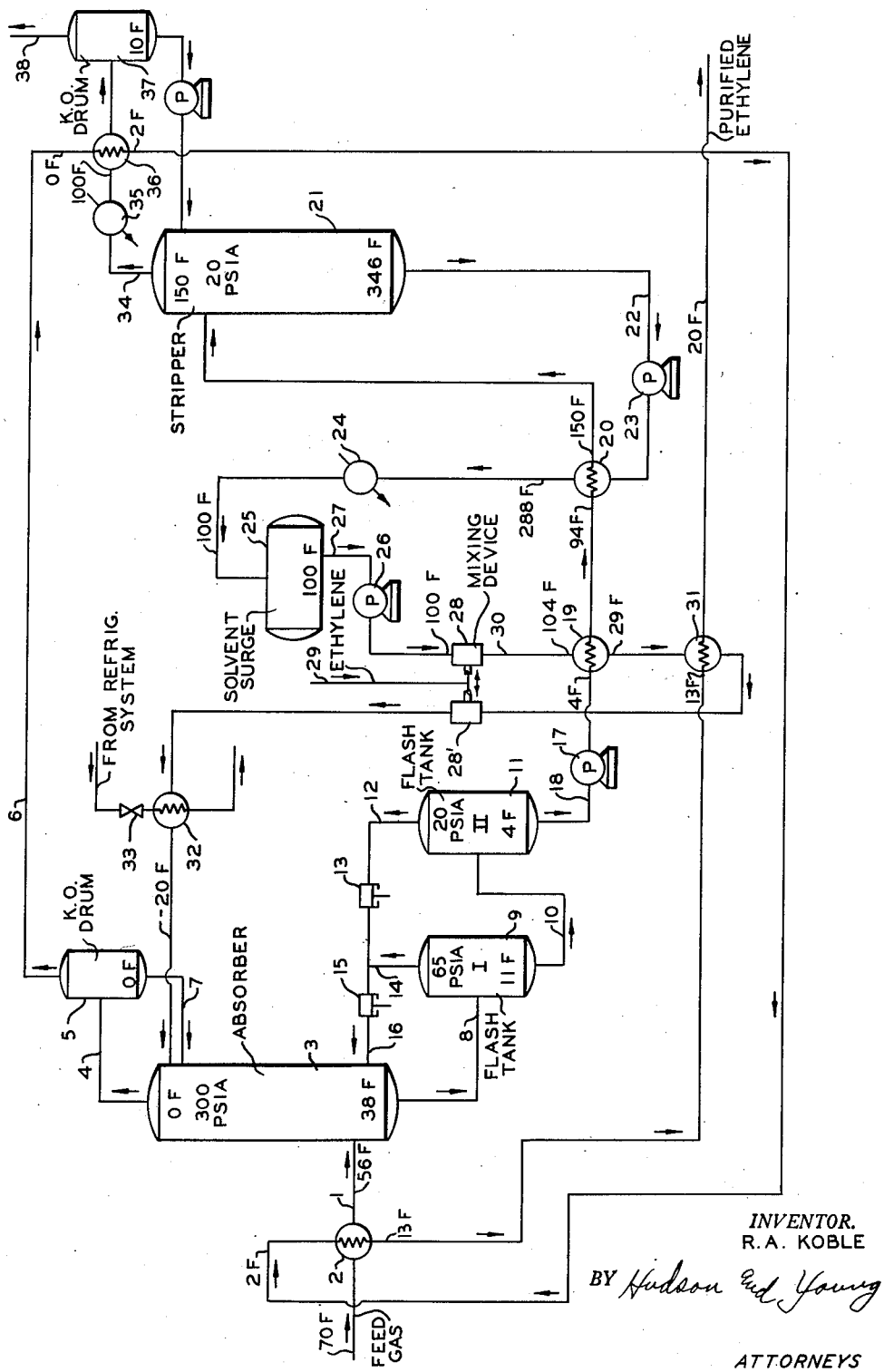

2,806,552

ABSORPTION PROCESS

Robert A. Koble, Bartlesville, Okla., assignor to Phillips Petroleum Company, a corporation of Delaware Application February 27, 1956, Serial No. 567,876

4 Claims. (Cl. 183—115)

This invention relates to removal of one component from a gaseous mixture by selective absorption. In one aspect this invention relates to an improved method of acetylene absorption and recovery. In another aspect this invention relates to an improved system for the selective absorption and recovery of a component contained in a gaseous mixture.

In the high temperature, thermal cracking of light hydrocarbons to form olefins such as ethylene, acetylene is usually produced in varying amounts as a by-product. The presence of acetylene so produced, even though in small amounts, frequently exerts a harmful effect on the subsequent usage of the olefin. For example, in the reaction of ethylene with benzene over an aluminum chloride catalyst, the presence of acetylene in the feed results in greatly increased catalyst consumption, since acetylene is a poison to aluminum halide catalyst.

The removal of acetylene from a gaseous mixture by contacting the mixture with selective solvent is well known. Dimethylformamide (DMF) has been found to be a particularly useful solvent. However, since dimethylformamide is a high boiling material and since absorption processes operate more efficiently at low temperatures, a high temperature differential usually exists between the absorber and the stripper. The rich oil from the absorber must be heated before being passed to the stripper and the lean oil which is recovered from the stripper at a higher temperature must be cooled before use in the absorber. In addition, since the absorption of hydrocarbons in the dimethylformamide results in the liberation of heat, temperature control within the absorption zone is important. The conservation of both heat and refrigeration within the process is important for economical operation.

An object of this invention is the provision of an improved system for the removal of a particular component from a gaseous mixture. Another object is the provision of a heat exchange relationship which can be operated to control temperatures at both ends of the heat exchange system or can be operated to effect maximum heat recovery at one end and maximum refrigeration recovery at the other end simultaneously. A further object is the provision of an improved means for separating acetylene from ethylene. The removal and recovery of acetylene from a gaseous mixture is a further object of the invention. Other and further objects and advantages will be apparent to one skilled in the art upon study of the disclosure of the invention.

Broadly the invention contemplates a means for the optimum utilization of heat and refrigeration in the process of selectively absorbing and removing a component from a gaseous mixture by first indirectly heat exchanging the lean oil returned from the stripper with partially preheated rich oil from the absorber, then cooling the lean oil with any suitable extraneous cooling medium such as water or air and finally again cooling the lean oil by indirect heat exchange with rich oil. I have found that an additional advantage results from contacting the lean oil with the material from which the component is selectively absorbed during the heat exchange steps so as to remove a major portion of the heat of absorption outside the absorber and prior to a refrigeration step.

In a more specific application the invention contemplates the selective absorption of acetylene from a gaseous mixture containing acetylene. Ethylene is ordinarily present in an acetylene-containing gaseous mixture, therefore, it is usually advantageous to at least partially saturate the lean solvent with ethylene during the steps of indirect heat exchange of the rich oil and lean oil. The saturation of the solvent with ethylene should occur simultaneously with cooling the solvent because the capacity of the solvent for the relatively less soluble ethylene is greatly increased as the temperature is lowered. In my process this cooling is accomplished by cooling with an extraneous medium at ambient temperature and heat exchange within the system so that refrigeration for this step is avoided.

The accompanying drawing is a flow sheet diagrammatically illustrating the invention and the operation of a preferred embodiment of my invention.

Referring now to the drawing, a gaseous mixture comprising ethylene and acetylene is fed to the process via line 1 and is indirectly heat exchanged with purified ethylene in heat exchanger 2 so as to give up a portion of its heat and is then passed to the bottom of absorber 3. Absorber 3 is equipped with suitable vapor-liquid contacting devices of any type well known in the art such as bubble trays, contact masses and the like and in addition can be provided with suitable internal or external intercooling means (not shown). Gases leave the top of absorber 3 via conduit 4 and are passed to knock-out drum 5 from which substantially acetylene-free ethylene is withdrawn via conducit 6 and liquid is returned to the absorber via conduit 7. The bottoms product from the absorber comprises the rich oil and is passed via conduit 8 to a first flash tank 9, which is operated at some lower pressure than the absorber. Vapors are removed from flash tank 9 via conduit 14 and are returned to the bottom of the absorber by means of compressor 15 and conduit 16. The liquid from flash tank 9 is passed via conduit 10 to a second flash tank 11, which is operated at a still lower pressure. Vapors are removed from flash tank 11 via conduit 12, are compressed in compressor 13 and are combined with vapors from flash tank 9 for return to the absorber.

The liquid from flash tank 11 is passed by means of pump 17 via line 18 through heat exchangers 19 and 20 to stripper 21. The stripper 21 is provided with suitable vapor-liquid contacting means which can be the same as or different from those employed in absorber 3. Stripper 21 is also provided with suitable internal or external reboiling means at the bottom (not shown). The bottoms product from the stripper comprises the lean oil and is passed via conduit 22 by means of pump 23 through heat exchangers 20 and 24 into tank 25. The liquid from tank 25 is passed via conduit 27 by means of pump 26 through a mixing device 28 wherein the liquid is mixed with acetylene-free ethylene supplied via conduit 29. The mixture leaves mixing device 28 via conduit 30 and is cooled in heat exchangers 19, 31 and 32 before passing to the top of the absorber. Additional ethylene can be introduced by additional mixing devices after further heat exchange; for example, additional ethylene can be introduced through mixing device 28' after exchanger 31. Heat exchanger 32 receives refrigerant from an external refrigeration system controlled by valve 33.

The overhead from stripper 21 passes via conduit 34 through heat exchangers 35 and 36 where the overhead vapors are cooled and partially condensed. The vapor and liquid mixture is passed to knock-out drum 37, from which the condensate is returned to the stripper and substantially pure acetylene is recovered via conduit 38.

I have found that this process has several important advantages. By operating with the heat exchange system as shown, the areas in heat exchangers 19, 20, and 24 are the minimum. By interposing water cooler 24 between indirect heat exchangers 19 and 20 the temperature of the lean oil leaving heat exchanger 19 is reduced more than by using the water cooler after the heat exchange of rich and lean solvent. In addition, ethylene is introduced into the lean solvent at a temperature such that a major portion of the heat of absorption is removed economically by indirect heat exchange with cold solvent. This reduces the amount of refrigeration required in heat exchanger 32. Thus, by the application of my invention maximum economy of both heat and refrigeration is obtained in a novel and simplified process. Although this process is described for acetylene removal with dimethylformamide, it is obvious that my invention would be applicable to the use of other selective solvents for acetylene, such as acetone and acetic anhydride and to processes for absorbing materials other than acetylene.

The following example illustrates my invention but is not to be construed as limiting the invention.

EXAMPLE

A typical run in a system similar to that illustrated in the drawing and utilizing my invention is represented in the following tabulation.

*Table*

|  | Absorber, 300 p. s. i. a. | | | | Ethylene to Solvent Stream | Stripper, 20 p. s. i. a. | | |
| --- | --- | --- | --- | --- | --- | --- | --- | --- |
|  | Hydrocarbon feed | Overhead Product | Bottoms Product | Solvent Feed |  | Feed | Bottoms Product | Overhead Product |
| Mols/unit of time: | | | | | | | | |
| Methane | 13 | 14 |  | 1 | 1 |  |  |  |
| Acetylene | 211 |  | 255 |  |  | 211 |  | 211 |
| Ethylene | 12,983 | 14,968 | 1,901 | 2,127 | 2,127 | 142 |  | 142 |
| Ethane | 130 | 151 | 19 | 22 | 22 | 1 |  | 1 |
| DMF |  |  | 8,800 | 8,800 |  | 8,800 | 8,800 |  |
| Temperature, °F | 56 | 0 | 38 | −20 | 100 | 150 | 346 | 10 |

In the prior art methods of heat exchange between the cold rich oil and the hot lean oil it is the usual practice to utilize one heat exchanger instead of the two heat exchangers 19 and 20. Thus if 20 is eliminated the high temperature outlet from 19 can be controlled by varying the flow of cooling water to exchanger 24 but the low temperature outlet will be uncontrolled. If it is preferred to control the low temperature outlet then the high temperature outlet will be uncontrolled.

In the system of my invention the low temperature outlet of exchanger 19 can be controlled by bypassing the exchanger or by varying the flow of cooling water in heat exchanger 24. The high temperature (150° F.) outlet of exchanger 20 can be controlled independently of exchanger 19 by bypassing exchanger 20. Bypass lines for exchangers 19 and 20 are not shown but are usually an integral part of such installation.

Ordinarily maximum cooling will be applied to exchanger 24 to effect refrigeration economy by reducing the temperature of the outlet of exchanger 19 to a minimum. The rich oil effluent from 20 will be heated so as to effect a saving of steam in the stripper.

An important feature of my invention lies in the fact that less heat exchange surface area is required in a system utilizing my invention than is required in a conventional system. Thus in a system according to the drawing exchanger 19 has an area of 2290 square feet, exchanger 20 has an area of 115 square feet and exchanger 24 has an area of 1090 square feet which amounts to a total of 3495 square feet. In a conventional system wherein one heat exchanger is utilized instead of 19 and 20 that heat exchanger would have an area of 4330 square feet and exchanger 24 would have an area of 500 square feet which amounts to a total of 4830 square feet or almost 28 percent more area than in the system of the invention.

Reasonable variations and modifications are possible within the scope of the disclosure of the present invention, the essence of which is an improved system for heat exchange of cold rich oil with hot stripped oil, in an absorption process, wherein the heat exchange is accomplished in two steps with a cooling step between the two heat exchange steps wherein the hot oil is cooled with an extraneous cooling medium; it is furthermore contemplated to introduce the component from which the desired material is to be absorbed into the solvent so that at least a portion of the heat of absorption can be removed without the use of refrigeration.

That which is claimed is:

1. In a process for the removal of one component of a gaseous mixture by contacting the mixture with a selective solvent for said component and removing said component from solution in said solvent in a stripping step, the improvement comprising passing hot depleted solvent from which said component has been stripped in indirect heat exchange relationship with partially warmed solvent containing said dissolved component; passing said depleted solvent in heat exchange relationship with an extraneous cooling medium; contacting said depleted solvent with the material in said gaseous mixture from which said component is absorbed; passing the resulting mixture of said material and said depleted solvent in indirect heat exchange relationship with cold solvent containing said dissolved component; further cooling said depleted solvent; and passing said depleted solvent in contact with said gaseous mixture.

2. In a process for the removal of acetylene from a gaseous mixture by contacting the mixture with an acetylene solvent and removing dissolved acetylene from said solvent in a stripping step, the improvement comprising passing the hot depleted solvent from which dissolved acetylene has been removed in indirect heat exchange with partially warmed acetylene-containing solvent passing to said stripping step; passing the depleted solvent in indirect heat exchange with an extraneous cooling medium; contacting said depleted solvent with ethylene; passing the mixture of solvent and ethylene in indirect heat exchange with cold acetylene-containing solvent passing to said stripping step; cooling said solvent; and passing said solvent in contact with said gaseous mixture.

3. In a process for the removal of acetylene from a gaseous mixture by contacting the mixture with an acetylene solvent in a first contacting step and removing dissolved acetylene from said solvent in a stripping step, the improvement comprising passing the hot depleted solvent from which dissolved acetylene has been removed in indirect heat exchange with partially warmed acetylene-containing solvent passing from the contacting step, as hereinafter described, to said stripping step; passing the depleted solvent in indirect heat exchange with an extraneous cooling medium; contacting said depleted solvent with ethylene; removing acetylene-containing solvent from said first contacting step; reducing the pressure on said acetylene-containing solvent in at least one flashing operation; returning vapor from said flashing operation to said first contacting step; passing the mixture of solvent and ethylene in indirect heat exchange with cold acetylene-containing solvent passing from said flashing step to said stripping step; cooling said solvent; and passing said solvent in contact with said gaseous mixture.

4. In a process for the removal of acetylene from a gaseous mixture by contacting the mixture with an acetylene solvent in a first contacting step and removing dissolved acetylene from said solvent in a stripping step, the improvement comprising passing the hot depleted solvent from which dissolved acetylene has been removed in indirect heat exchange with partially warmed acetylene-containing solvent passing from the contacting step, as hereinafter described, to said stripping step; passing the depleted solvent in indirect heat exchange with an extraneous cooling medium; contacting said depleted solvent with ethylene; removing acetylene-containing solvent from said first contacting step; reducing the pressure on said acetylene-containing solvent in at least one flashing operation; returning vapor from said flashing operation to said first contacting step; passing the mixture of solvent and ethylene in indirect heat exchange with cold acetylene-containing solvent passing from said flashing step to said stripping step; contacting said depleted solvent with additional ethylene; cooling said solvent; and passing said solvent in contact with said gaseous mixture.

References Cited in the file of this patent
UNITED STATES PATENTS

| | | |
|---|---|---|
| 2,250,925 | Babcock | July 29, 1941 |
| 2,596,785 | Nelly et al. | May 13, 1952 |
| 2,608,270 | McDonald et al. | Aug. 26, 1952 |